(12) United States Patent
Patterson et al.

(10) Patent No.: US 7,747,593 B2
(45) Date of Patent: Jun. 29, 2010

(54) COMPUTER AIDED DOCUMENT RETRIEVAL

(75) Inventors: David Patterson, County Antrim (GB); Vladimir Dobrynin, St. Petersburg (RU)

(73) Assignees: University of Ulster, Coleraine (GB); St. Petersburg State University, St. Petersburg (RU)

( * ) Notice: Subject to any disclaimer, the term of this patent is extended or adjusted under 35 U.S.C. 154(b) by 44 days.

(21) Appl. No.: 10/573,482

(22) PCT Filed: Sep. 27, 2004

(86) PCT No.: PCT/EP2004/010877

§ 371 (c)(1),
(2), (4) Date: Mar. 24, 2006

(87) PCT Pub. No.: WO2005/031600

PCT Pub. Date: Apr. 7, 2005

(65) Prior Publication Data

US 2007/0174267 A1      Jul. 26, 2007

(30) Foreign Application Priority Data

Sep. 26, 2003   (GB) .................................. 0322600.8

(51) Int. Cl.
G06F 7/00      (2006.01)
G06F 17/30    (2006.01)

(52) U.S. Cl. ..................... 707/705; 707/736; 707/737; 707/748; 707/999.005; 704/231; 704/240; 704/245

(58) Field of Classification Search ......... 707/736–737, 707/748, 999.005
See application file for complete search history.

(56) References Cited

U.S. PATENT DOCUMENTS

| | | | | | |
|---|---|---|---|---|---|
| 4,839,853 | A | * | 6/1989 | Deerwester et al. | 707/5 |
| 5,442,778 | A | * | 8/1995 | Pedersen et al. | 707/5 |
| 5,787,422 | A | * | 7/1998 | Tukey et al. | 707/5 |
| 5,839,106 | A | * | 11/1998 | Bellegarda | 704/257 |
| 6,094,653 | A | * | 7/2000 | Li et al. | 707/6 |
| 6,128,613 | A | * | 10/2000 | Wong et al. | 707/7 |
| 6,584,456 | B1 | * | 6/2003 | Dom et al. | 706/45 |
| 6,687,696 | B2 | * | 2/2004 | Hofmann et al. | 707/6 |
| 2002/0042793 | A1 | * | 4/2002 | Choi | 707/6 |
| 2002/0107853 | A1 | * | 8/2002 | Hofmann et al. | 707/7 |

(Continued)

OTHER PUBLICATIONS

Matsuo, Y., et al, "Keyword Extraction from a single document using word co-ocurrence Statistical Information," International Journal on Artificial Intelligence Tools, Jul. 13, 2003, pp. 392-396.*

*Primary Examiner*—Mohammad Ali
*Assistant Examiner*—Angelica Ruiz
(74) *Attorney, Agent, or Firm*—The Nath Law Group; Jerald L. Meyer; Jiaxiao Zhang

(57) ABSTRACT

A method of determining cluster attractors for a plurality of documents comprising at least one term. The method comprises calculating, in respect of each term, a probability distribution indicative of the frequency of occurrence of the, or each, other term that co-occurs with said term in at least one of said documents. Then, the entropy of the respective probability distribution is calculated. Finally, at least one of said probability distributions is selected as a cluster attractor depending on the respective entropy value. The method facilitates very small clusters to be formed enabling more focused retrieval during a document search.

18 Claims, 5 Drawing Sheets

U.S. PATENT DOCUMENTS

| | | | |
|---|---|---|---|
| 2002/0156763 A1* | 10/2002 | Marchisio | 707/1 |
| 2003/0004966 A1* | 1/2003 | Bolle et al. | 707/104.1 |
| 2003/0065635 A1* | 4/2003 | Sahami et al. | 706/48 |
| 2003/0120630 A1* | 6/2003 | Tunkelang | 707/1 |
| 2003/0212519 A1* | 11/2003 | Campos et al. | 702/101 |
| 2003/0212520 A1* | 11/2003 | Campos et al. | 702/101 |
| 2003/0212692 A1* | 11/2003 | Campos et al. | 707/100 |
| 2004/0034652 A1* | 2/2004 | Hofmann et al. | 707/102 |
| 2004/0068697 A1* | 4/2004 | Harik et al. | 715/513 |
| 2005/0097108 A1* | 5/2005 | Wang et al. | 707/100 |
| 2006/0282236 A1* | 12/2006 | Wistmuller | 703/2 |
| 2007/0208772 A1* | 9/2007 | Harik et al. | 707/102 |

\* cited by examiner

COMPUTER AIDED DOCUMENT RETRIEVAL

FIELD OF THE INVENTION

The present invention relates to computer aided document retrieval from a document corpus, especially a controlled document corpus. The invention relates particularly to computer aided document clustering.

BACKGROUND TO THE INVENTION

Computer aided document searching typically involves the use of one or more computer programs to analyse a document corpus and then to search through the analysed document corpus. Analysis of a document corpus may involve organising the documents into a plurality of document clusters in order to facilitate the searching process. Typically, this involves the use of one or more computer programs for implementing a clustering algorithm. Searching through a document corpus is typically performed by a computer program commonly known as a search engine.

A feature that has a significant impact on the architectural design of a search engine is the size of the document corpus. Another important consideration is whether the maintenance of the document corpus (adding and deleting documents) is open to all users (an uncontrolled corpus such as the Internet) or whether maintenance is controlled, for example by an administrator, (a controlled corpus such as an Intranet). More generally, a controlled corpus comprises a dataset that is controlled by an administrator or a dataset that it wholly accessible.

Conventional search algorithms return, as a search result, a ranked list of documents which should contain all or a part of the whole set of keywords presented in a user query. Such systems determine document relevancy based on key word frequency occurrence or by making use of references and links between documents. Often many search results are returned and the user cannot easily determine which results are relevant to their needs. Therefore although recall may be high, the large number of documents returned to achieve this results in low precision and a laborious search for the user to find the most relevant documents.

Additionally, a conventional search engine returns a flat ranked list of documents. If the query topic is relatively broad then this list can contain documents belonging to many narrow subtopics.

In order to obtain the best results from conventional search algorithms, which are based on word statistics, a user needs to have statistical knowledge about the document corpus before he forms a query. This knowledge is never known a priori and as such the user rarely forms good queries. With a thematic search, knowledge about cluster descriptions can be provided to the user, enabling them to improve and intelligently refine their queries interactively.

Conventional search engines often use additional information such as links between web pages or references between documents to improve the search result.

The concept of document-clustering-based searching or browsing is known (for example, the Scatter-Gather browsing tool [4]). The main problems with this type of approach are its applicability to real life applications, and the efficiency and effectiveness of the clustering algorithms. Unsupervised clustering algorithms fall into hierarchical or partitional paradigms. In general similarities between all pairs of documents must be determined thus making these approaches un-scalable. Supervised approaches require a training data set which may not always be readily available, can add to the cost of a project and can take a long time to prepare.

A different approach to the problem of thematic-focusing retrieval is considered in [5]. This system uses a set of agents to retrieve from the internet, or filter from a newsgroup, documents relevant to a specific topic. Topics are described manually in text form. Additionally a set of rules is generated manually in a special rule language to describe how to compare a document with a topic, i.e. which words from the topic description should be used and how these words influence the category weights. The resulted document category is determined using calculated category weights and fuzzy logic. The main disadvantage of this approach is that all topic descriptions and rules are defined manually. It is impossible to predict in advance what the given topic descriptions and corresponding rule set, sufficient to retrieve the relevant documents, are, with high precision and recall. Therefore, a large amount of manual work and research is required to generate effective topic descriptions and rules. As such, this approach cannot be considered as scalable.

Automatic topic discovery through the generation of document clusters could be based on such techniques as Probabilistic Latent Semantic Indexing [6]. Probabilistic Latent Semantic Indexing uses a probabilistic model and the parameters of this model are estimated using the Estimation Maximization algorithm. This is seen as a limitation of this approach. For example, the number of clusters must be set in advance reducing its flexibility.

In [7], another example of a search engine based on information-theoretic approaches to discover information about topics presented in the document corpus is outlined. The main idea is to generate a set of so called topic threads and use them to present the topic of every document in the corpus. The topic thread is a sequence of words from a fixed system of word classes. These classes are formed as a result of an analysis of a representative set of randomly selected documents from the document corpus (a training set). Words from different classes differ by probabilities of occurrence in the training set and hence represent topics at different levels of abstraction. A thread is a sequence of these words in which the next word belongs to a more narrow class and neighbouring words from this sequence should occur in the same document with a sufficiently high probability. Every document from the document corpus is assigned one of the possible topic threads. Cross-entropy is then used as a measure to select a topic thread which is most relevant to the topic of the document. This topic thread is stored in the index and is used at the search stage instead of the document itself. The main disadvantage of this approach is that only a relatively small part of information about a document is stored in the index and used during search. Also these thematic threads cannot be used to cluster documents into thematic clusters and hence information about the topic structure of the document corpus is hidden to a user.

It would be desirable to mitigate the problems outlined above.

SUMMARY OF THE INVENTION

One aspect of the invention provides a method of determining cluster attractors for a plurality of documents, each document comprising at least one term, the method comprising: calculating, in respect of each term, a probability distribution indicative of the frequency of occurrence of the, or each, other term that co-occurs with said term in at least one of said documents; calculating, in respect of each term, the entropy of the respective probability distribution; selecting at least one of said probability distributions as a cluster attractor depending on the respective entropy value.

Each probability distribution may comprise, in respect of each co-occurring term, an indicator that is indicative of the total number of instances of the respective co-occurring term in all of the documents in which the respective co-occurring term co-occurs with the term in respect of which the probability distribution is calculated. Each probability distribution may comprise, in respect of each co-occurring term, an indicator comprising a conditional probability of the occurrence of the respective co-occurring term in a document given the appearance in said document of the term in respect of which the probability distribution is calculated. Advantageously, each indicator is normalized with respect to the total number of terms in the, or each, document in which the term in respect of which the probability distribution is calculated appears.

In a preferred embodiment, the method may comprise assigning each term to one of a plurality of subsets of terms depending on the frequency of occurrence of the term; and selecting, as a cluster attractor, the respective probability distribution of one or more terms from each subset of terms. Each term may be assigned to a subset depending on the number documents of the corpus in which the respective term appears. An entropy threshold may be assigned to each subset, and the method may include selecting, as a cluster attractor, the respective probability distribution of one or more terms from each subset having an entropy that satisfies the respective entropy threshold. Advantageously, the method comprises selecting, as a cluster attractor, the respective probability distribution of one or more terms from each subset having an entropy that is less than or equal to the respective entropy threshold.

Each subset may be associated with a frequency range, wherein the frequency ranges for respective subsets are disjoint. Each subset may be associated with a frequency range, the size of each successive frequency range being equal to a constant multiplied by the size of the preceding frequency range in order of increasing frequency. In one embodiment, the respective entropy threshold increases, for example linearly, for successive subsets in order of increasing frequency.

Another aspect of the invention provides a computer program product comprising computer program code for causing a computer to perform the method of determining cluster attractors.

A further aspect of the invention provides an apparatus for determining cluster attractors for a plurality of documents, each document comprising at least one term, the apparatus comprising: means for calculating, in respect of each term, a probability distribution indicative of the frequency of occurrence of the, or each, other term that co-occurs with said term in at least one of said documents; means for calculating, in respect of each term, the entropy of the respective probability distribution; and means for selecting at least one of said probability distributions as a cluster attractor depending on the respective entropy value.

A still further aspect of the invention provides a method of clustering a plurality of documents, the method including determining cluster attractors in accordance with the method described above.

In one embodiment, the clustering method comprises: calculating, in respect of each document, a probability distribution indicative of the frequency of occurrence of each term in the document; comparing the respective probability distribution of each document with each probability distribution selected as a cluster attractor; and assigning each document to at least one cluster depending on the similarity between the compared probability distributions.

The clustering method may include organising the documents within each cluster by: assigning a respective weight to each document, the value of the weight depending on the similarity between the probability distribution of the document and the probability distribution of the cluster attractor; comparing the respective probability distribution of each document in the cluster with the probability distribution of each other document in the cluster; assigning a respective weight to each pair of compared documents, the value of the weight depending on the similarity between the compared respective probability distributions of each document of the pair; calculating a minimum spanning tree for the cluster based on the respective calculated weights.

A further aspect of the invention provides a computer program product comprising computer program code for causing a computer to perform the aforesaid clustering method.

From one aspect, a preferred embodiment of the invention provides means by which a document corpus can be indexed efficiently into document clusters, based on specific narrow contexts that are automatically identified from the corpus as a whole. Entropy is advantageously used to identify these narrow contexts. This indexing process facilitates very small clusters to be formed enabling more focused retrieval.

From another aspect, a preferred embodiment provides means for discovering a plurality of narrow contexts relevant to a user's query and facilitating retrieval from the corpus based on this.

The present invention relates to the area of search within a document corpus. It provides an efficient approach to indexing documents within the corpus based on the concept of narrow contexts. Document clusters are produced that are small in size and so easily facilitate the visualisation of inter document similarity, enabling rapid identification of the most relevant documents within a cluster. Based on detailed analysis of a controlled document corpus, the preferred embodiment supports a thematic information search by combining a keyword search facility with browsing. As a result, the user receives a set of documents relevant to the topics of his information needs.

In the preferred embodiment, the corpus is initially analysed and partitioned into thematically homogeneous clusters, using a clustering algorithm whose complexity is proportional to the size of the corpus. A keyword search may then be used to identify a set of clusters relevant to a query. The internal organisation of documents within a cluster may be represented as a graph-like structure, in which documents in close proximity have high similarity. The set of the most relevant documents to the query are advantageously identified within a cluster through a process of computer guided browsing.

In a preferred embodiment, a user receives, as a result of a query, a list of narrow subject-specific clusters of documents. All documents, in all returned clusters, are considered by the search algorithm as relevant to the user's information needs. Many of the returned documents contain no specific keywords from the actual query itself but they are considered to be relevant by the system because their topic(s) correspond to the users information needs as defined by the initial query. Thus, documents may be returned that cannot be retrieved by a conventional keyword search algorithm. This results in high precision and recall and a smaller search for the user.

In a preferred embodiment, during the searching process a list of clusters are returned ranked according to their relevancy to the query. These clusters cover a range of topics. Therefore, the user has focused access to detailed information relating to the entire topical structure of that part of the document corpus directly corresponding to the query. The user can then select a cluster whose topic(s) is of most relevance to him and continue the search inside this cluster using computer aided browsing techniques advantageously based on a minimum spanning tree visualisation of the documents contained within the cluster.

The preferred system is unsupervised, but has a complexity proportional to the size of the document corpus and is therefore cost effective and scalable to real life applications such as a controlled corpus search.

The preferred clustering algorithm, when applied to a thematically heterogeneous document corpus, produces thematically homogeneous clusters of relatively small size. This simplifies the retrieval stage, as returned clusters are compact enough to enable efficient computer guided browsing.

The preferred embodiment does not use a probabilistic model and as such the number of clusters is determined automatically. Additionally, the preferred information theoretic approach (entropy and Jensen-Shannon divergence) presents a more natural measure for estimating similarity between documents, documents and cluster centroids/attractors and the broadness or narrowness of a context.

Information about the topical structure of the whole document corpus may be presented to the user. This information can even be used to improve the quality of queries prepared for conventional enterprise search engines. In addition, it is possible to use the present invention in combination with a conventional internet search engine such as Google and Alta Vista to increase the usefulness of the results of the search procedure, via a synergistic effect.

Further advantageous aspects of the invention will become apparent to those ordinarily skilled in the art upon review of the following description of a preferred embodiment of the invention.

BRIEF DESCRIPTION OF THE DRAWINGS

An embodiment of the invention is now described by way of example and with reference to the accompanying drawings in which.

DETAILED DESCRIPTION OF THE DRAWINGS

Figure 5:
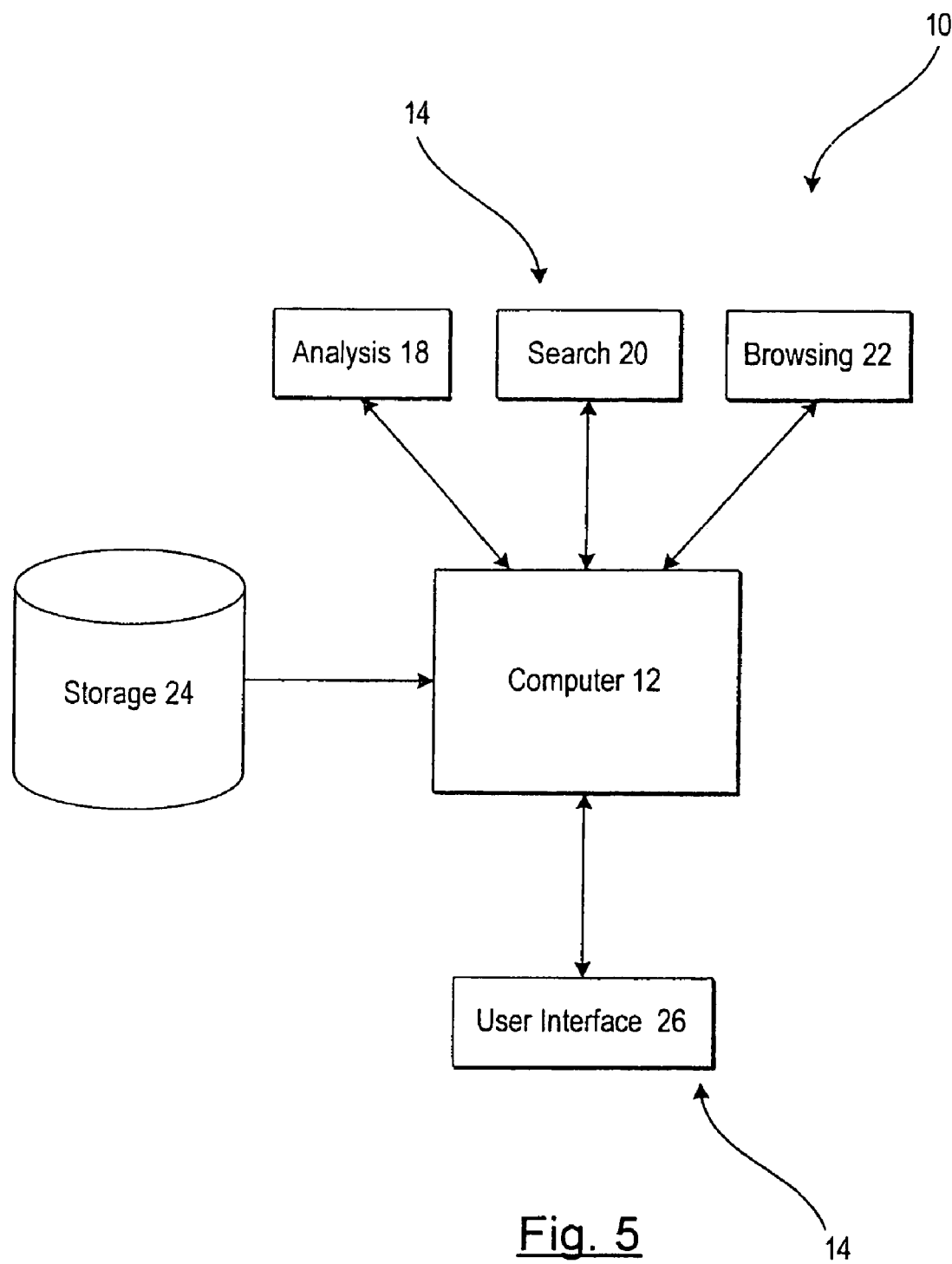
FIG. 5 illustrates a computer-based document retrieval system.

Referring first to FIG. 5, there is shown an example of a document retrieval system generally indicated as 10. The system 10 comprises at least one computer 12 arranged to run one or more computer programs which are represented collectively at 14.

Figure 1:
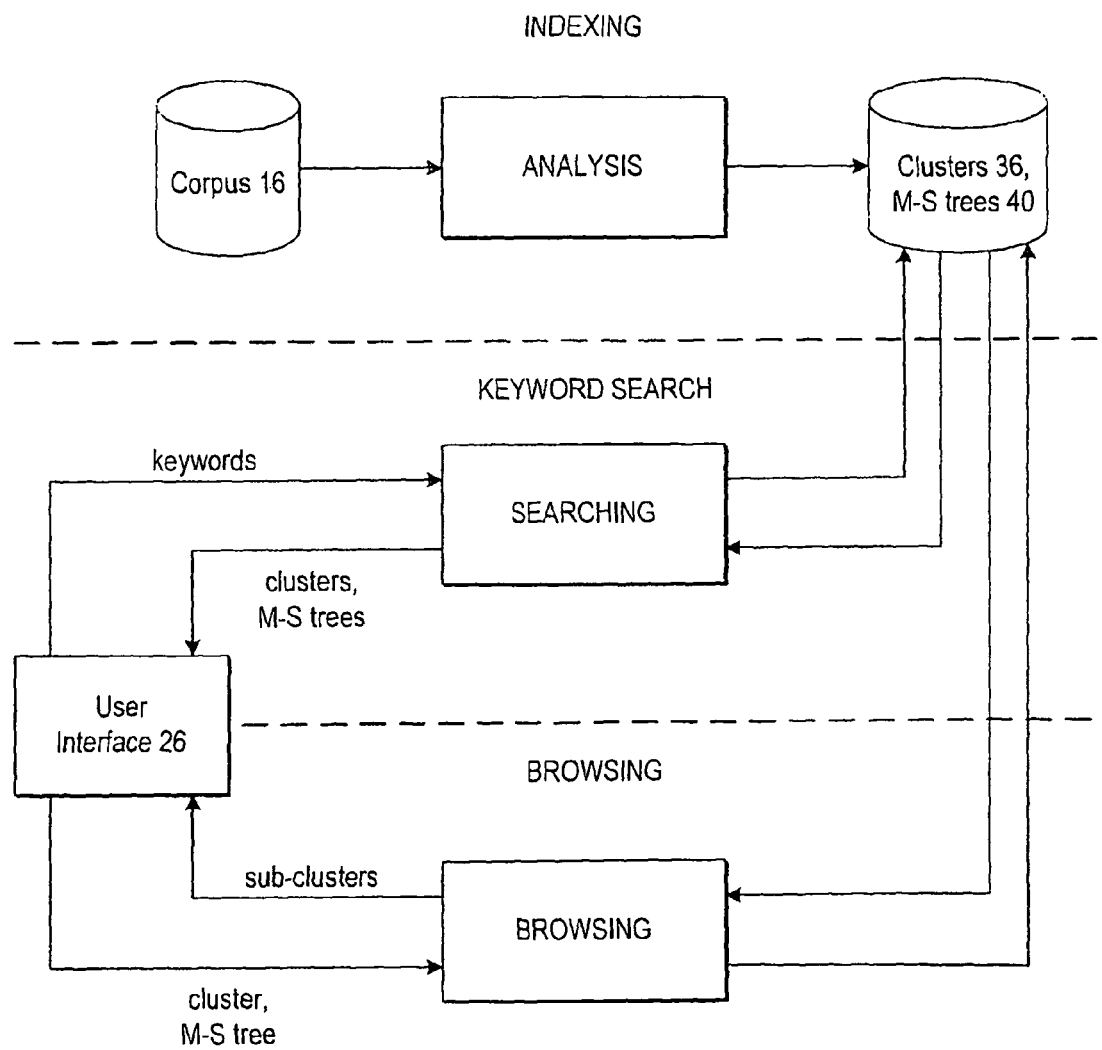
FIG. 1 provides a block diagram of a document retrieval process.
Figure 2:
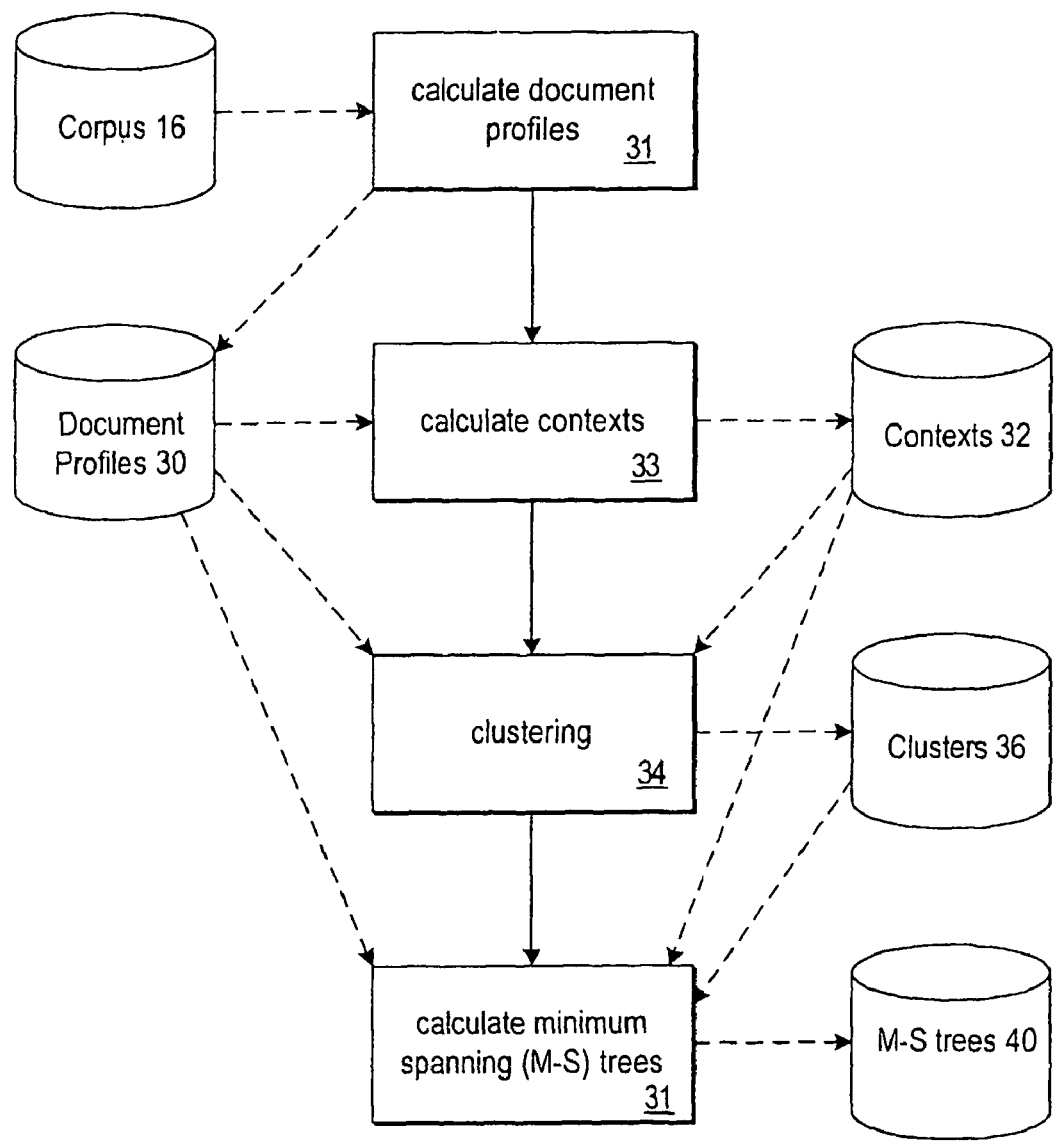
FIG. 2 shows an indexing process of the document retrieval process of FIG. 1 in more detail.

The computer 12 is in communication with a storage device 24 containing a document corpus 16 (or any form of heterogeneous unstructured data) (FIGS. 1 and 2). The document corpus 16 comprises a plurality of computer readable documents (not shown). The document corpus 16 may be a controlled document corpus, meaning that the maintenance of the corpus 16 is controlled by one or more administrators (not shown). Moreover, the documents in the document corpus 16 are typically heterogeneous in content. The storage device 24 comprise a database or any other data repository or storage means. It will be understood that the term "document" as used herein embraces any computer readable or electronically readable body of text or terms, including emails, SMS messages, word processor documents or other application generated files or electronic messages or files.

In the preferred embodiment, the computer programs 14 include a module 18 for analysing, or indexing, the document corpus 16 in order to form document clusters (each document cluster comprising a set of one or more documents from the corpus 16 that have been grouped together). The analysis module 18 includes means for implementing a clustering algorithm, as is described in more detail below. A search module or engine 20 is also provided that is capable of performing key word searches through a plurality of computer readable documents and presenting a set of results (typically comprising one or more documents) to a user via a user interface 26. A browsing module 22 is preferably also provided that is capable of allowing a user, via the user interface 26, to browse through the results provided by the search module 20. It will be understood that the analysis, search and browsing modules 18, 20, 22 may each comprise one or more computer programs.

The storage device 24 may also be used to store data generated by one or more of the analysis, search and browsing modules 18, 20, 22. In particular, the storage means 24 may be used to store term contexts, document clusters and, in the preferred embodiment, minimum spanning trees, as is described in more detail below. It will be understood that the document corpus 16, document clusters and other data need not necessarily be stored in the same storage device.

The system 10 of FIG. 5 is shown in simplistic form. The system components may communicate directly with one another or via a computer network, such as an intranet. Moreover, one or more other computers, or clients (not shown), may be present in the system 10, each capable of running at least the search module 20, a user interface 26 and typically also the browsing module 22, or instances thereof, in order that a respective user may search through the clustered contents of the document corpus 16. Typically, such client computers are in communication with the storage means 24 via a computer network.

FIG. 1 provides an overview of the preferred document retrieval process. The process may be considered in three stages. The first stage is indexing, the second is keyword search and the third is computer guided browsing. The indexing stage involves analysing the documents in the document corpus 16 to produce document clusters and, in a preferred embodiment, also to organise the documents within each cluster, e.g. via a minimum spanning tree. The keyword search stage involves retrieving one or more document clusters and, where applicable, a respective minimum spanning tree, in response to a user query comprising key words. The browsing stage involves browsing through the documents of the returned clusters, advantageously using the minimum spanning tree.

The following description of a preferred embodiment of the invention is divided into two parts. The first, corpus analysis, describes how the document corpus 16 is indexed to facilitate retrieval (see section 1). The second section, retrieval, describes the actual search (section 2.1) and browsing (section 2.2) describes processes used to locate the most relevant documents from the corpus 16 based on a user query.

1. Corpus Analysis

A preferred method of corpus analysis is now described and may be implemented by the analysis module 18.

Figure 3:
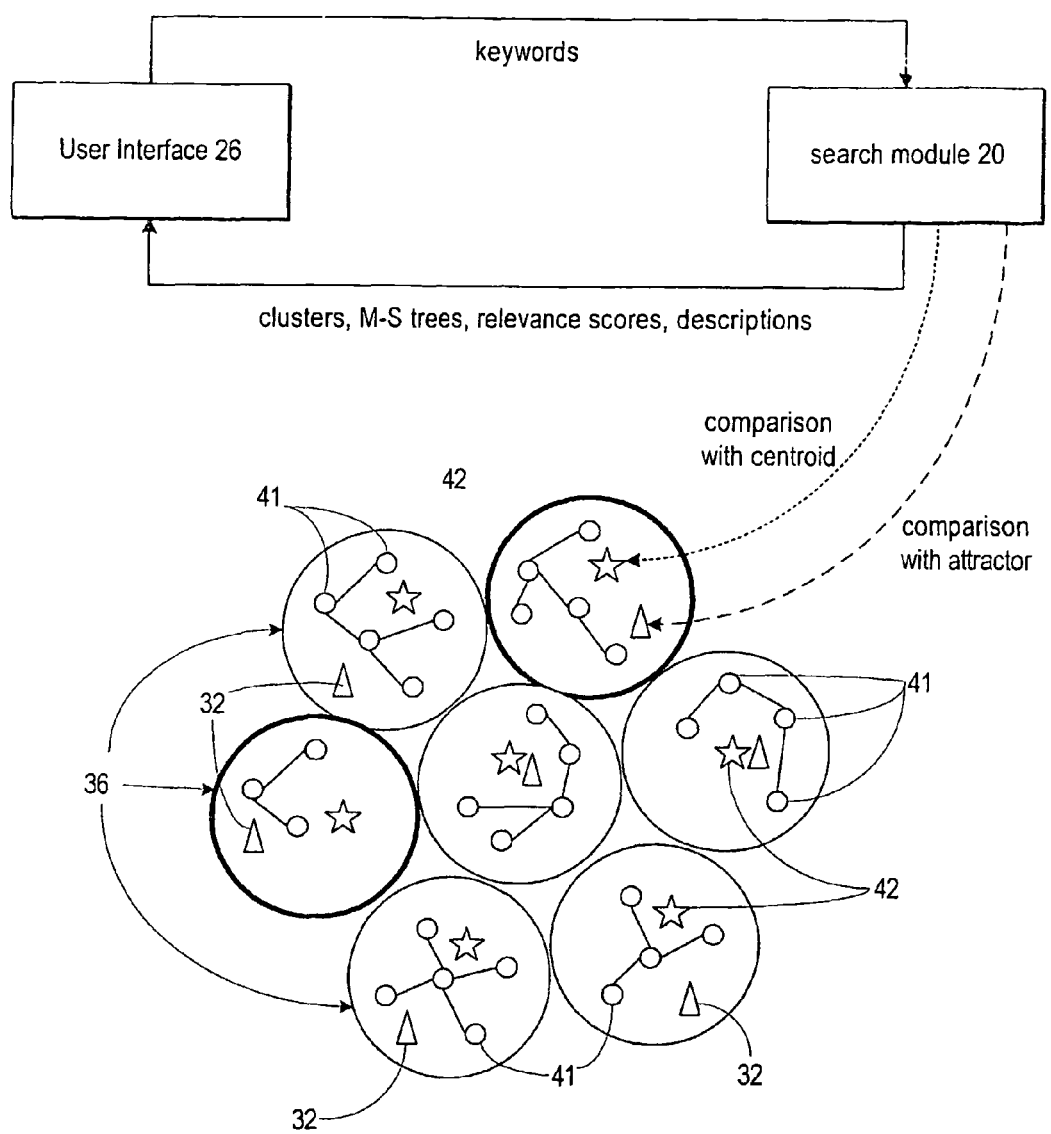
FIG. 3 illustrates a keyword search process showing how relevant clusters are identified from a user query.
Figure 4:
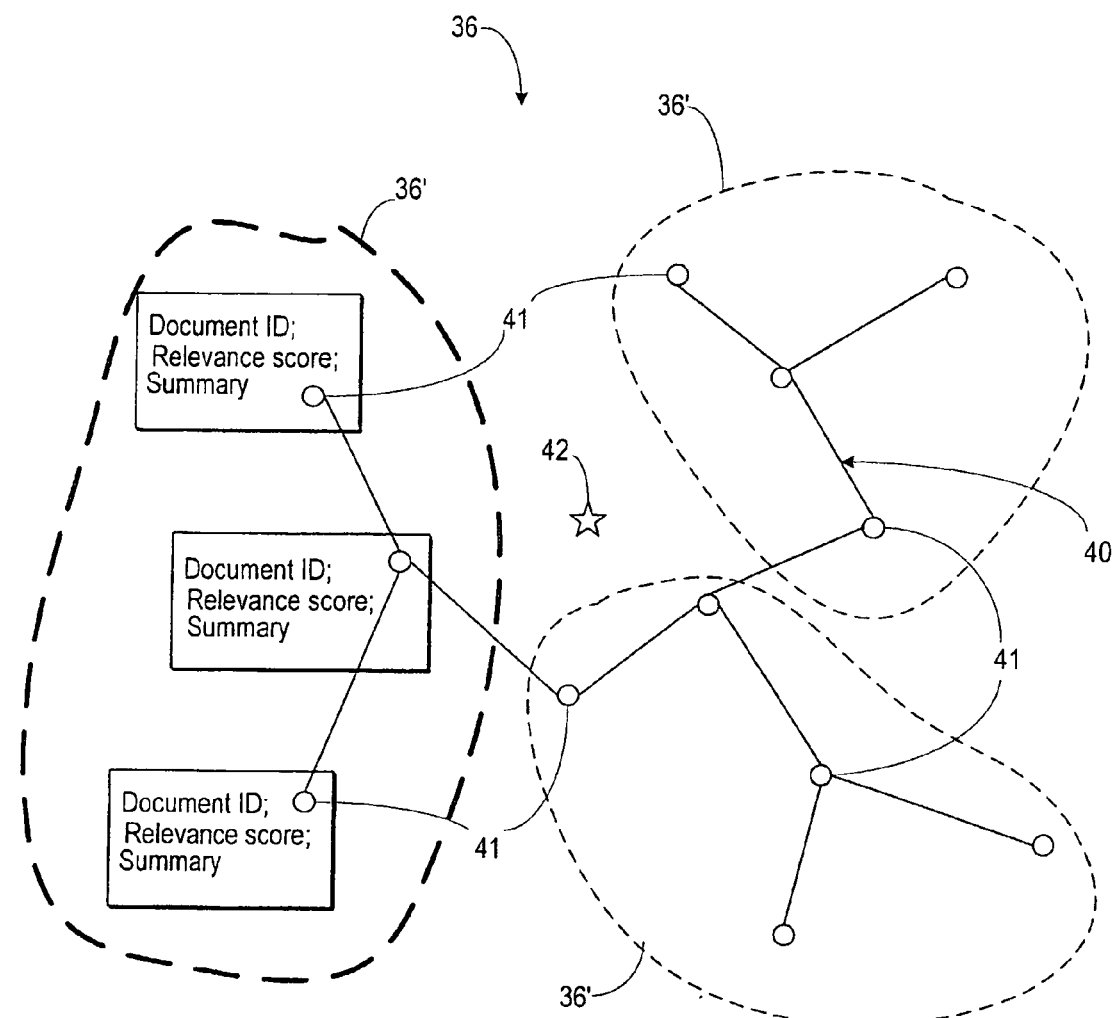
FIG. 4 illustrates a computer guided browsing process.

Corpus analysis is described with reference to FIG. 2. FIG. 2 illustrates how document clusters 36 are formed based on generated profiles 30 of the documents and by defining one or more contexts 32 for each document. FIGS. 3 and 4 show how the concept of a minimum spanning tree 40 can be used to visualise the inter document similarity within clusters.

Corpus analysis may be divided into three stages: Narrow contexts discovery; Document clustering; and Internal cluster structure discovering.

1.1 Narrow Contexts Discovery

One problem with document clustering is to determine a respective entity to serve as the focus, or attractor, for each cluster. The selection of cluster attractors can have a significant impact on the size and content of the resulting cluster which in turn can have a significant impact on the effectiveness of a search through the clusters. One aspect of the present invention provides a method for determining cluster attractors. In the preferred embodiment this involves identifying one or more contexts that are considered to be relatively narrow, as is described in more detail below.

Each document in the corpus 16 comprises one or more instances of at least one term and typically comprises a plurality of terms. A term comprises one or more words. A context for a term is represented by a conditional probability distribution, or vector of probability indicators, over all, or a plurality of, terms from the corpus, where the probability distribution is defined by the frequency of terms which co-occur with the context term. In the preferred embodiment, the frequency of each term is the total number of instances of the term in all of the documents in which the term co-occurs with the context term. Preferably, each term frequency is normalized with respect to, or divided by, the total number of terms in all of the documents in which the context term appears. In general, given a context term, the conditional probability of a co-occurring term is the normalized total number of times the co-occurring term appears across all documents that the context term appears in.

Respective contexts can therefore be represented by a respective probability distribution, or vector, over a plurality terms. Each probability vector typically comprises at least one term, each term in the vector being associated with a respective probability, or frequency, indicator. The probability, or frequency, indicator preferably indicates the probability of the occurrence, or frequency of occurrence, of the respective term in documents which contain the context term. A context can be viewed as being either broad or narrow in scope. In the preferred embodiment, a context is described as narrow if its entropy is small and broad if its entropy is large.

Referring to FIG. 2, an analysis of the documents in the corpus 16 is performed (module 31 in FIG. 2) to produce document profiles 30, as is described in more detail below. An analysis of the documents in the corpus 16 is also performed (module 33 of FIG. 2) to calculate a respective context for each term in the corpus 16, as is described in more detail below. In FIG. 2, the stored document profiles are indicated as 30 and the stored contexts are indicated as 32 and may be stored in any convenient manner, for example in the storage means 24.

A preferred method of calculating contexts is now described. Let X denote the set of all documents in the document corpus 16 and let Y denote the set of all terms present in X, i.e. the set of all terms present in one or more of all of the documents in the corpus 16. For a given term z, where Z∈Y, we can define a context for term z as comprising a topic of a set of documents that term z occurs in. More specifically, the context of the term z is preferably represented in the form of conditional probability distribution P(Y|z). Here the random variable Y takes values from Y and p(y|z) is the probability that, in a randomly selected document from the corpus 16 which contains the term z, a randomly selected term is the term y. Only when variable Y represents a term that co-occurs with term z in a document will its respective probability contribute to the overall probability distribution P(Y|z). The probability distribution p(y|z) can be approximated as $$p(y \mid z) = \frac{\sum_{x \in X(z)} tf(x, y)}{\sum_{x \in X(z), t \in Y} tf(x, t)},$$

where tf(x, y) is the term frequency of the term y in the document x and X(z) is the set of all documents from the corpus 16 which contain the term z and where t is a term index.

Therefore, given a document corpus 16 and a term z, we can describe the context of this term as a weighted set, or vector, of terms that occur with the given term z in one or more documents of the corpus 16. The respective weight associated with each term preferably comprises an indication of the probability of occurrence, or frequency of occurrence, of the respective term across all of the documents in which the term z appears. In one embodiment, to generate this context, all documents from the corpus 16 in which the given term z appears may be combined in a single document prototype. Then, the respective frequency of occurrence of all terms in this new document prototype may be calculated and, conveniently, normalized by dividing by the prototype document length (i.e. the number of terms in the prototype document). These normalized frequencies of all terms from the combined prototype document represent the context for term z. Hence, the context for term z comprises a plurality or vector of terms that co-occur with term z in at least one of the documents of the corpus 16, each term of the set being associated with a respective weight that is indicative of the frequency of occurrence of the respective term in the, or each, document in which term z appears. A respective context is calculated for each term present in the documents of the corpus 16. Alternative measures of frequency of occurrence may be used.

In many cases, the context of a term z is too broad to present useful information about the corpus 16. It is therefore desirable to identify terms which occur in narrow contexts. The narrowness of the context of a term z is preferably estimated as the entropy H(Y|z) of the respective probability distribution P(Y|z), where:

$$H(Y \mid z) = -\sum_{y} p(y \mid z) \log p(y \mid z).$$

If the entropy value is relatively small then the context is considered "narrow", otherwise it is "broad".

In the preferred embodiment, a respective context is calculated for all meaningful and non redundant terms presented in the corpus. A respective entropy value is then calculated for each context. Based on the respective entropy values, a number of the contexts are then selected to provide a core, or attractor, for a respective document cluster. As is described in more detail below, contexts with a relatively low entropy are selected for this purpose.

Let Y(z) denote the set of all different terms from documents from X(z). Where there is a uniform distribution of terms from Y(z) the entropy H(Y|z) is equal to log |Y(z)|. According to Heaps Law [1] log |Y(z)|=0(log |X(z)|). As the document frequency for z is df(z)≡|X(z)| there is a logarithmic relationship between the entropy and document frequency and, as such, it is reasonable to use document frequency as a means for determining the bounds on the subsets of narrow contexts.

The narrowness, or otherwise, of a context can be determined in terms not only of its entropy, but also by the frequency of occurrence of the respective term collectively throughout all of the documents in the corpus 16. It is difficult to set in advance the number of narrow contexts that are required to describe the content of the corpus 16 in detail, i.e. the number of cluster attractors that are required. In a preferred embodiment, each term in the term set Y is assigned to one of a plurality of term subsets depending on the frequency of occurrence of the respective term in the corpus 16, and preferably on the number of documents of the corpus 16 that the respective term appears in (although other measures of frequency may be used). The subsets are preferably disjoint, or non-overlapping, in their respective frequency range. This may be expressed as:

$$Y = \cup_i Y_i, Y_i = \{z : z \in Y, df_i \leq df(z) \leq df_{i+1}\}, i=1, \ldots, r.$$

Here df(z)≡|X(z)| refers to the document frequency of a term z, the document frequency being the number of times the term z appears at least once in a document and r is the number of subsets. The parameter r may take a variety of values and may be set as a system parameter depending on the size and nature of the corpus 16.

In the preferred embodiment, all terms assigned to a given subset satisfy the following requirements: the frequency of occurrence of the respective term is within the respective frequency range for the respective subset; frequency ranges for respective subsets are disjoint, or non-overlapping; and, more preferably, the size of the frequency range of a given subset is equal to a constant multiplied by the range of the previous subset. The constant can take any value greater than one. For example, in one embodiment, the constant takes the value 2. Accordingly, the frequency range of a given subset is twice as large as the frequency range of the previous subset and half as large as frequency range of the next subset. So, for example, a first subset may contain terms that appear, say, in between 1 and 25 documents in the corpus 16, the second subset may contain terms that appear in between 26 and 75 documents, the third subset may contain terms that appear in between 76 and 175 documents, and so on.

An entropy threshold is assigned to each subset of terms. The respective thresholds may conveniently be pre-set as system parameters, as may the definition of term subsets. Preferably, the threshold for a given subset is less than the threshold for the next subset (where the next subset contains terms with a higher frequency than the previous subset). More preferably, the respective threshold for successive subsets (with increasing frequency range) increase linearly. More formally, in a preferred embodiment, the thresholds $df_i$ may be said to satisfy the condition $df_{i+1} = \alpha \cdot df_i$ where $\alpha > 1$ is a constant. It can be shown that H(Y|z) is bounded from above by a linear function of the index i so it is reasonable to set a linear function threshold $H_{max}(i)$ to select a set Z of terms with narrow context:

$$Z = \cup_i \{z : z \in Y_i, H(Y|z) \leq H_{max}(i)\}.$$

Accordingly, in the preferred embodiment, a term context is selected as being narrow if its entropy is less than, or is less than or equal to, the respective threshold value associated with the term subset to which the term is assigned.

1.2 Document Clustering

The set of narrow contexts $\{P(Y|z)\}_{z \in Z}$ are considered as cluster attractors, i.e. each selected narrow context may be used as a core entity about which a respective document cluster may be formed.

In order to cluster documents, every document x in the corpus 16 is represented in the form of a respective document profile 30 comprising a respective probability distribution P(Y|x), where $$p(y|x) = \frac{tf(x,y)}{\sum_{t \in Y}(x,t)}$$

Hence the respective document profile 30 for each document x comprises a weighted set, or vector, of terms that occur within the document x. The respective weight associated with each term in the vector preferably comprises an indication of the probability of occurrence, or frequency of occurrence, of the respective term in the document x. Conveniently, the respective weight comprises the frequency of occurrence of the respective term in the document x, normalized with respect to, or divided by, the number of terms in the document x.

Document clustering (module 34 in FIG. 2) may be performed by comparing the respective document profile 30 of each document in the corpus 16 with each context 32 that has been selected as a cluster attractor. In the preferred embodiment, each document of the corpus 16 is associated with, or assigned to, one or more contexts 32 that most closely matches, or resembles, its document profile 30. The result of assigning each document of the corpus 16 to a cluster attractor context 32 is to create a plurality of document clusters (collectively represented as 36 in FIG. 2), each cluster comprising a respective plurality of documents from the corpus 16.

A preferred method of comparing the document profiles 30 with contexts 32 that have been selected as a cluster attractors is to estimate the distance, or similarity, between a document x and the context of the term z using, for example, the Jensen-Shannon divergence [2] between the probability distributions $p_1$ and $p_2$ representing the document x (i.e. its document profile 30) and the context of term z:

$$JS_{\{0.5, 0.5\}}[p_1, p_2] = H[\bar{p}] - 0.5 H[p_1] - 0.5 H[p_2],$$

where H[p] denotes the entropy of the probability distribution p and $\bar{p}$ denotes the average probability distribution $\bar{p} = 0.5 p_1 + 0.5 p_2$.

A document x is therefore assigned to a cluster 36 with attractor context of the term z if:

$$z = \arg\min_{t \in Z} JS_{\{0.5, 0.5\}}[P(Y|t), P(Y|x)].$$

Hence, a document is assigned to a cluster where the JS divergence between a document and an attractor is a minimum over all attractors.

1.3. Internal Cluster Structure

In a preferred embodiment, the documents within each cluster 36 are advantageously analysed in order to structure, or organise, the documents within each cluster 36. To this end, the documents within a cluster 36 are represented as a set of notional graph vertices, each document corresponding with a respective vertex. Each vertex is assigned a weight that is equal to, or dependent on, the distance between the respective document and the context of the respective cluster attractor. Each vertex is associated with, or connected to, each other vertex, by a respective un-oriented edge, whose weight is dependent on, or equal to, the distance between the respective document profiles 30 of the corresponding documents. The distance between document profiles 30 may conveniently be determined using the Jensen-Shannon divergence in a manner similar to that described above. An algorithm, for example the standard Kruskal's algorithm [3] may be used (see module 38 of FIG. 2) to construct a minimum spanning tree 40 which spans all graph vertices and has the minimum average weight for its edges. The minimum spanning tree can be presented to a user via a suitable user interface as a complete description of the internal structure of the respective cluster. It is noted that other conventional algorithms may be used to build the minimum spanning tree.

The operations described in section 1 may conveniently be performed by the analysis module 18. The data produced by the analysis module 18 including, as applicable, the document profiles 30, contexts 32, clusters 36 and minimum spanning trees 40 may be stored in any convenient manner, for example in storage means 24. The operations performed by the analysis module 18 are typically performed off-line, before a user begins to search the document corpus 16

2. Retrieval

The preferred retrieval algorithm comprises means for conducting a keyword search (FIG. 3) in combination with means for browsing (FIG. 4) through the results of the keyword search to locate the most relevant documents for a user. The keyword search and browsing may be performed by separate modules 20, 22 respectively, or may be performed by a single module.

2.1 Keyword Search

The goal of the keyword search phase is to find one or more clusters 36 that are relevant to the topics of a user's information needs as defined by one or more keywords provided by the user in a search query.

From FIG. 3, it may be seen that each document cluster 36 comprises a plurality of documents (each represented by a respective vertex 41), an attractor context 32 and a centroid 42. The centroid 42 comprises an average probability distribution, or vector, $P_{avr}(Y|z)$, of terms appearing in the documents of the respective document cluster $C(z)$. $P_{avr}(Y|z)$ may be calculated in a similar manner to $P(Y|z)$ as described above, using the following equation (which is similar to the equation given above for $p(y|z)$):

$$p_{avr}(y|z) = \frac{\sum_{x \in C(z)} tf(x,y)}{\sum_{x \in C(z), t \in Y} tf(x,t)}.$$

Hence, every document cluster $C(z)$ may be represented by two probability distributions over the term set Y, namely:

(i) the context $P(Y|z)$ of the term z serving as the attractor for the cluster; and (ii) the average probability distribution $P_{avr}(Y|z)$, or centroid 42, which presents information about all documents assigned to the cluster.

During the keyword search phase, the user presents their information needs in the form of a set of keywords $Q=\{q_{1,K}, q_s\}$. It is desirable in a controlled document corpus search that the system should achieve maximum recall, therefore all clusters 36, $C(z)$ which are estimated as relevant to the query are preferably present to the user via the user interface 26. The preferred criteria used to determine the relevancy of cluster $C(z)$ to the query Q is as follows:

$$p(q_i|z) \cdot p_{avr}(q_i|z) > 0, i=1, \ldots, s.$$

That is, a cluster 36, $C(z)$ is considered as relevant to the query Q if every query's keyword is present in both the cluster attractor and at least one document from that cluster (and hence in the centroid 42).

The degree of cluster $C(z)$ relevance to the query Q may be estimated as an additive function of keywords scores as follows:

$$\mathrm{rel}(Q, C(z)) = \Sigma_{q \in Q} p(q|z) p_{avr}(q|z)$$

This allows relevant clusters to be returned to the user in ranked order of relevancy. In the preferred embodiment, a list of relevant clusters is returned to the user in order of decreasing relevancy scores.

To estimate the cluster content the user may be provided with a short summary description of the cluster in the form of the list of most heavily weighted terms which occur in the cluster documents. Given term t, its weight within a cluster $C(z)$ is estimated as a multiplicative function of its respective weight in the relevant cluster attractor vector $P(Y|z)$ and in the relevant cluster content vector $P_{avr}(Y|z)$. Hence:

$$\mathrm{weight}(t|C(z)) = p(t|z) p_{avr}(t|z).$$

2.2 Cluster Browsing

The preferred browsing process is illustrated in FIG. 4. FIG. 4 shows a minimum spanning tree 40 split into sub-trees using a pre-set diameter, or distance parameter, i.e. the respective distance between each document and each other document in a cluster can be calculated, for example using Jensen-Shannon divergence, and documents can then be grouped in sub-trees, each document in a sub-tree having a distance from each other document in the sub-tree that is less than or equal to the pre-set distance parameter. This enables the user to quickly locate the most relevant sub-tree wherein lie the most relevant documents. The minimum spanning tree 40 can thus be used to estimate distances between documents 41 in the cluster 36. Then any sub-tree of the tree T(z), within the predefined diameter, can be considered as a sub-tree or sub-cluster 36' of the main cluster C(z). This allows the efficient splitting of large clusters into smaller generally homogeneous sub-clusters 36'. A short summary for each sub-cluster 36' can be generated in the same way as the summary for C(z). The user can then quickly look through summaries of all sub-clusters and select one or more for detailed browsing.

As may be seen from FIG. 4, the user may browse documents in a cluster using a visual representation of a minimum spanning tree 40, T(z) as a guide. The tree 40 graphically represents the similarity of documents 41 in the relevant cluster 36 to other documents 41 in the cluster 36 and to the cluster attractor 32.

Different approaches can then be used to help the user efficiently select the part of the tree 40 with the most relevant documents. For example, a conventional keyword search can be used to find a set of documents which contain the given set of keywords. These documents could be considered as starting points for browsing using the minimum spanning tree 40 to visualise the internal structure of the cluster 36. Because every cluster 36 contains a relatively small number of documents 41, a controlled vocabulary, generated automatically from the documents themselves (i.e. comprising terms appearing in the document corpus 16 as a whole, or just in the documents of the, or each, cluster 36 being browsed) is preferably used to help the user to generate good queries.

The following characteristics and advantages of the preferred embodiment of the invention will be apparent from the foregoing description. Narrow contexts can be distinguished, or identified, by words, or terms, which occur only in documents belonging to, or associated with, the respective narrow context, where narrowness is measured by conditional entropy.

During the clustering process, the similarity between documents is estimated not directly but through their similarity to a cluster attractor using, for example, Jensen-Shannon divergence. This results in more precise similarity estimations compared to conventional approaches in which all documents are compared directly with each other to determine similarities. This conventional approach is meaningless and unnecessary in many cases, as often documents have little resemblance to each other and so there is no need to calculate similarity. In the preferred embodiment, similarity between documents is determined only for documents within the same cluster where it is known they have generally common topics. This results in a more meaningful, efficient and scaleable approach to similarity determination. The clustering techniques described herein are unsupervised in nature and therefore do not need background knowledge. When the preferred indexing method is applied to a thematically heterogeneous document corpus, it produces thematically homogeneous clusters of relatively small size thus enabling computer guided browsing of the documents they contain. An additional feature of the preferred indexing method is that subjects or topics that are similar to a user's query, but which are not directly mentioned in the query itself, are automatically identified as relevant. This may be seen as creativity on the part of the indexing algorithm. Hence, during a keyword search documents clustered around these similar topics are returned as part of the query result, thus improving recall. The minimum spanning tree describes the structure of the cluster in such a way that any sub-tree of the tree within a given small diameter can be considered as a narrow thematic sub-cluster of the given cluster. This improves the efficiency of the search for the user as short summaries of these sub-clusters can be generated and used to locate the most relevant documents.

The invention is not limited to the embodiment described herein which may be modified or varied without departing from the scope of the invention.

REFERENCES

[1] Baeza-Yates and Ribeiro-Neto, Modern Information Retrieval, ACM Press, 1999.
[2] Lin, J. Divergence Measures Based on the Shannon Entropy, IEEE Transactions on Information Theory, 37(1), pp. 145-151, 1991.
[3] Kruskal, J. B. On the Shortest Spanning Subtree of a Graph and the Traveling Salesman Problem, Proc. Amer. Math. Soc., 7:1, pp. 48-50, 1956.
[4] Pedersen Jan. O., Karger D., Cutting D. R., Tukey J. W. Scatter-gather: a cluster-based method and apparatus for browsing large document collections. U.S. Pat. No. 5,442,778. Aug. 15, 1995.
[5] Swannack C. M., Coppin B. K., McKay Grant C. A., Charlton C. T. Data acquisition system. Jul. 4, 2002. US Patent Application 2002/0087515 A1
[6] Hofmann T., Pusicha J. C. System and method for personalized search, information filtering, and for generating recommendations utilizing statistical latent class models. US Patent Application 2002/0107853 A1, Aug. 8, 2002
[7] Wing S. Wong, An Qin. Method and apparatus for establishing topic word classes based on an entropy cost function to retrieve documents represented by the topic words. U.S. Pat. No. 6,128,613. Oct. 3, 2000.

The invention claimed is:

1. A computer-implemented method of determining cluster attractors for use in clustering a plurality of documents, each document comprising at least one term, each term comprising one or more words, the method comprising:
  causing a computer to calculate, in respect of each term, a probability distribution that is indicative of
    in the instance where a document comprises said term and said one other term that co-occurs with said term in at least one of said documents, the frequency of occurrence of said one other term, and
    in the instance where a document comprises said term and more than one other term that co-occurs with said term in at least one of said documents, the respective frequency of occurrence of each other term, that co-occurs with said term in at least one of said documents;
  causing a computer to calculate, in respect of each term, the entropy of the respective probability distribution; and
  causing the computer to select at least one of said probability distributions as a cluster attractor depending on the respective entropy value;
  wherein the selected cluster attractor is a clustering focus for at least some of said documents, and wherein said probability distribution is calculated as $$p(y \mid z) = \frac{\sum_{x \in X(z)} tf(x, y)}{\sum_{x \in X(z), t \in Y} tf(x, t)}$$

where tf(x, y) is a term frequency of a term y in a document x and X(z) is a set of all documents of said plurality of documents that contain a term z and where t is a term index.

2. A method as claimed in claim 1, wherein each probability distribution comprises, in respect of each co-occurring term, an indicator that is indicative of the total number of instances of the respective co-occurring term in all of the documents in which the respective co-occurring term co-occurs with the term in respect of which the probability distribution is calculated.

3. A method as claimed in claim 1, wherein each probability distribution comprises, in respect of each co-occurring term, an indicator comprising a conditional probability of the occurrence of the respective co-occurring term in a document given the appearance in said document of the term in respect of which the probability distribution is calculated.

4. A method in claim 2, wherein each indicator is normalized with respect to the total number of terms in the document, or each document in which the term in respect of which the probability distribution is calculated appears.

5. A method as claimed in claim 1, comprising assigning each term to one of a plurality of subsets of terms depending on the frequency of occurrence of the term; and selecting, as a cluster attractor, the respective probability distribution of one or more terms from each subset of terms.

6. A method as claimed in claim 5, wherein each term is assigned to a subset depending on the number documents of the corpus in which the respective term appears.

7. A method as claimed in claim 5, wherein an entropy threshold is assigned to each subset, the method comprising selecting, as a cluster attractor, the respective probability distribution of one or more terms from each subset having an entropy that satisfies the respective entropy threshold.

8. A method as claimed in claim 7, comprising selecting, as a cluster attractor, the respective probability distribution of one or more terms from each subset having an entropy that is less than or equal to the respective entropy threshold.

9. A method as claimed in claim 5, wherein each subset is associated with a frequency range and wherein the frequency ranges for respective subsets are disjoint.

10. A method as claimed in claim 5, wherein each subset is associated with a frequency range, the size of each successive frequency range being equal to a constant multiplied by the size of the preceding frequency range in order of increasing frequency.

11. A method as claimed in claim 7, wherein the respective entropy threshold increases for successive subsets in order of increasing frequency.

12. A method as claimed in claim 11, wherein the respective entropy threshold for successive subsets increases linearly.

13. The method as claimed in claim 1, wherein the method further comprises:
  causing a computer to calculate, in respect of each term, the entropy of the respective probability distribution;
  causing the computer to select at least one of said probability distributions as a cluster attractor depending on the respective entropy value;
  causing the computer to compare each document with each cluster attractor; and
  causing the computer to assign each document to one or more cluster attractors depending on the similarity between the document and the cluster attractors,
  wherein assigning each document to one or more cluster attractors creates a plurality of document clusters, each cluster comprising a respective plurality of documents.

14. A method as claimed in claim 13, comprising: calculating, in respect of each document, a probability distribution indicative of the frequency of occurrence of each term in the document; comparing the respective probability distribution of each document with each probability distribution selected as a cluster attractor; and assigning each document to at least one cluster depending on the similarity between the compared probability distributions.

15. A method as claimed in claim 14, comprising organizing the documents within each cluster by: assigning a respective weight to each document, the value of the weight depending on the similarity between the probability distribution of the document and the probability distribution of the cluster attractor; comparing the respective probability distribution of each document in the cluster with the probability distribution of each other document in the cluster; assigning a respective weight to each pair of compared documents, the value of the weight depending on the similarity between the compared respective probability distributions of each document of the pair; calculating a minimum spanning tree for the cluster based on the respective calculated weights.

16. A method as claimed in claim 1, wherein said entropy is calculated as:

$$H(Y \mid z) = -\sum_y p(y \mid z) \log p(y \mid z)$$

17. An apparatus for determining cluster attractors for a plurality of documents, each document comprising at least one term, each term comprising one or more words, the apparatus comprising:
  means for calculating, in respect of each term, a probability distribution indicative of
    in the instance where a document comprises said term and one other term that co-occurs with said term in at least one of said documents, the frequency of occurrence of said one other term, and
    in the instance where a document comprises said term and more than one other term that co-occurs with said term in at least one of said documents, the respective frequency of occurrence of each other term;
  means for calculating, in respect of each term, the entropy of the respective probability distribution; and
  means for selecting at least one of said probability distributions as a cluster attractor depending on the respective entropy value,
  wherein the selected cluster attractor is a clustering focus for at least some of said documents, and wherein said probability distribution is calculated as $$p(y \mid z) = \frac{\sum_{x \in X(z)} tf(x, y)}{\sum_{x \in X(z), t \in Y} tf(x, t)}$$

where $tf(x, y)$ is a term frequency of a term y in a document x and $X(z)$ is a set of all documents of said plurality of documents that contain a term z and where t is a term index.

18. The apparatus as claimed in claim 17, wherein the apparatus further comprises:
  means for comparing each document with each cluster attractor; and
  means for assigning each document to one or more cluster attractors depending on the similarity between the document and the cluster attractors,
  wherein assigning each document to one or more cluster attractors creates a plurality of document clusters, each cluster comprising a respective plurality of documents.

* * * * *

UNITED STATES PATENT AND TRADEMARK OFFICE
CERTIFICATE OF CORRECTION

PATENT NO. : 7,747,593 B2  
APPLICATION NO. : 10/573482  
DATED : June 29, 2010  
INVENTOR(S) : David Patterson et al.

Page 1 of 1

It is certified that error appears in the above-identified patent and that said Letters Patent is hereby corrected as shown below:

Column 14, Claim 4, Line 53  
Please delete "A method in claim 2,"  
and replace with -- A method as claimed in claim 2, --

Signed and Sealed this

Seventeenth Day of August, 2010

David J. Kappos  
*Director of the United States Patent and Trademark Office*